Dec. 26, 1944.   T. S. BRISKIN   2,366,084
PROJECTOR
Filed Oct. 18, 1943   2 Sheets-Sheet 1
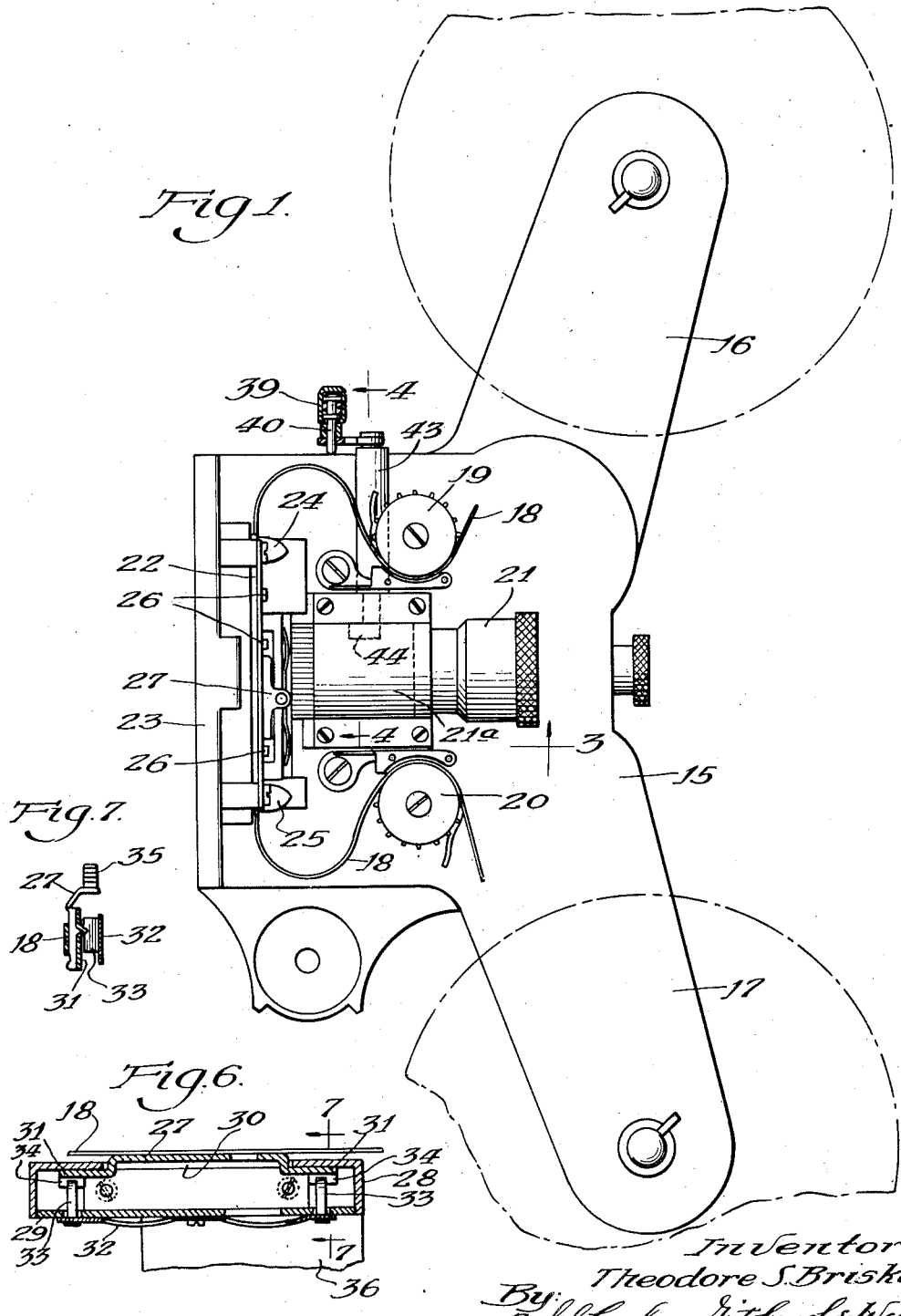
Inventor:
Theodore S. Briskin
By Zabel, Carlson, Fitzhugh & Wells
Attorneys Dec. 26, 1944. T. S. BRISKIN 2,366,084
PROJECTOR
Filed Oct. 18, 1943 2 Sheets-Sheet 2
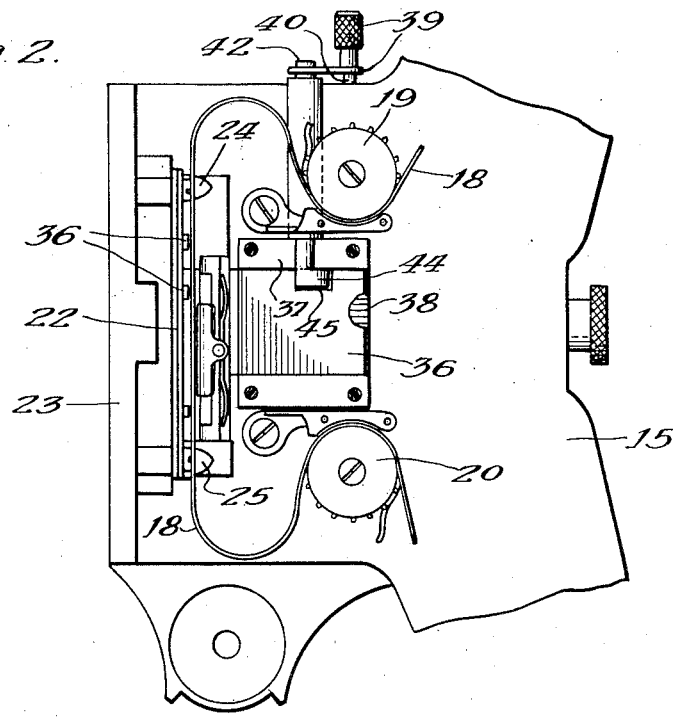
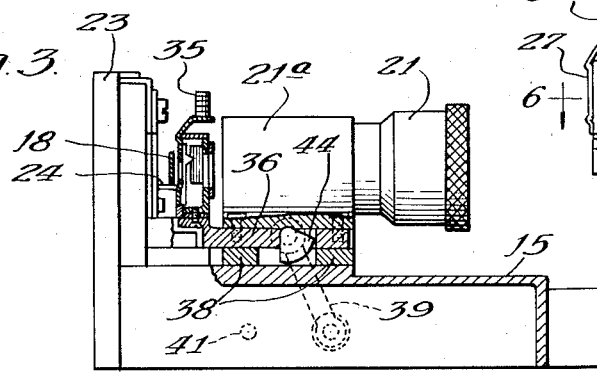
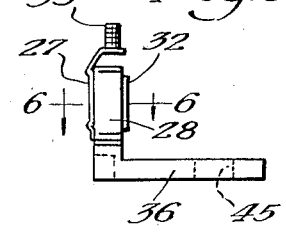
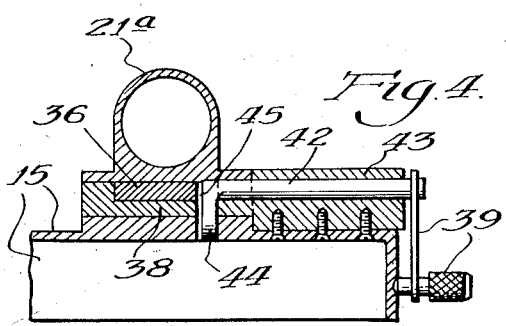
Inventor:
Theodore S. Briskin
By Zabel, Carlson, Fitzhugh & Wells
Attorneys Patented Dec. 26, 1944

2,366,084

UNITED STATES PATENT OFFICE 2,366,084

PROJECTOR

Theodore S. Briskin, Chicago, Ill., assignor to Revere Camera Company, Chicago, Ill., a corporation of Delaware Application October 18, 1943, Serial No. 506,660

4 Claims. (Cl. 88—17)

This invention relates to projectors and is directed particularly to the mechanism for controlling the film at the point where the ray of light passes through the film for projection purposes. It is the object of the invention to provide a new and improved form and arrangement of parts comprising the gate mechanism of a projector whereby an aperture shoe member is normally pressed lightly toward an aperture plate for holding the film slidably in position therebetween, and whereby the aperture shoe member may be moved readily away from the aperture plate so as to permit the film easily to be threaded into position. It is one of the objects of the invention to provide an improved arrangement by which the aperture shoe member may be moved directly away from the aperture plate without any angular movement so that when the shoe member is returned to operative position the pressure is applied evenly on the film. It is another object of the invention to provide improved means for mounting the aperture shoe member yieldingly in position on the part by which it is supported, so arranged as to provide for the quick and easy removal of the shoe member from its supporting means when desired.

It is another object of the invention to improve constructions of this type in sundry details hereinafter pointed out. The preferred means by which the several objects have been attained are illustrated in the accompanying drawings in which—

Figure 1 is a side face view of a fragmentary portion of a projector embodying the preferred form of the invention;

Figure 2 is a view similar to a portion of Figure 1 but with certain of the parts removed and with parts in changed positions;

Figure 3 is a horizontal sectional view taken substantially at the line 3—3 of Figure 1;

Figure 4 is a vertical sectional view taken substantially at the line 4—4 of Figure 1 but with certain of the parts removed;

Figure 5 is a bottom edge view of the forwardly and backwardly movable supporting means for the aperture shoe member with such member in position therein;

Figure 6 is a sectional view on an enlarged scale through the structure shown in Figure 5, being taken substantially at the line 6—6 in said figure; and Figure 7 is a sectional view taken substantially at the line 7—7 in Figure 6.

Referring now to the several figures of the drawings, in which corresponding parts are indicated by the same reference characters, 15 indicates a projector frame member in the form of a housing, having arms 16 and 17 thereon for mounting reels or other supporting means for a film 18 as usual in a machine of this type. The film 18 is shown in Figure 1 threaded about sprocket wheels 19 and 20 of any approved type which control the movement of the film from one reel to the other. Between the sprocket wheels a lens system 21 of any approved type is mounted in position by means of a socket member 21a in front of an aperture plate 22 which is carried by a transversely extending housing portion 23. Film guides 24 and 25 are provided, projecting forwardly from the aperture plate at one side of the path of the film therealong, considerably shorter guides 26 being provided at the opposite side of the path of the film.

An aperture shoe member 27 is movably supported in front of the aperture plate 22 and the film 18 by a supporting member 28 in the form of a housing bent into shape from sheet metal, as shown in Figure 6, the front face of the housing being closed by a plate 29. A substantial portion of the rear face of the housing member 28 is cut away at 30, such opening being extended also into the outer side face of the housing, as shown in Figs. 1 and 2, for receiving the shoe member removably in position therein. As is shown in Figures 6 and 7, the shoe member 27 has its end portions 31 offset forwardly, and the body portion of the shoe member is of such length as to have a working fit in the opening at 30, with the offset end portions of the shoe member engaging the front faces of wall portions of the housing member 27 so as to limit the backward movement of the shoe member. On the front face of the plate 29 I have mounted a thin flat metal spring 32 provided at its ends with blocks or plates 33 which extend backwardly through suitable openings in said plate 29. As is clearly shown in Figures 6 and 7, the end portions 31 of the shoe member are provided with forwardly extending ribs 34 pressed therein, which ribs have releasable snap engagement with notches in the rear edges of the plates 33. The spring 32 serves thus to press the shoe member 27 normally backwardly to the limit of its movement with respect to the housing member 28. The arrangement is such that the shoe member can be very easily and quickly inserted into position in the housing 28 and be quickly and easily removed therefrom, the spring 32 being adapted to yield forwardly if necessary for permitting such manipulations. The arrangement is such that when the shoe member is in position as shown in Figure 6 it can yield angularly in any direction responsive to pressure thereon by the film 18. For facilitating the manual movement of the shoe member 27 into and out of position a handle 35 is provided thereon.

As is best shown in Figure 5, the housing 28 is fixedly mounted on the rear end of a slide plate 36 which is slidably mounted between ribs 37 carried by a block 38 mounted on the framework. The arrangement is such that when the slide plate 36 is in its forward position as shown in Figure 2, the aperture shoe member 27 is spaced a substantial distance from the aperture plate 22 so as to permit the film 18 to be moved edgewise into and out of position between the plate 22 and the member 27. When however the slide plate 36 is moved backwardly along right lines to its operative position, the aperture shoe member 27 is brought into light pressure relationship with the aperture plate 22 so as to press the film 18 very lightly against the aperture plate. Means is provided for giving the slide plate 36 the desired forward and backward movements by the use of a handle 39 comprising a spring mounted pin 40, as is clearly shown in Figure 1, such pin 40 being adapted to have yielding engagement with either one of two sockets 41 provided in the top face of the wall of the housing (see Figure 3) for holding the handle releasably in either of its limit positions as desired. The handle 39 is mounted on a vertical shaft 42 rotatably mounted in a bearing block 43 carried by the frame 15, as is best shown in Figure 4. At its lower end, the shaft 42 is provided with a head or arm 44 engaging an opening 45 in the plate 36. The arrangement is such that when the handle 39 is swung to the limit of its motion forwardly, the plate 36 and the aperture shoe member 27 likewise are moved forwardly for permitting the easy threading of the film into position between the aperture shoe member 27 and the aperture plate 22. When the handle 39 is swung backwardly, the slide plate 36 also is moved backwardly for carrying the aperture shoe member into operative pressure relationship to the aperture plate.

I have found in practice that my improved arrangement operates very satisfactorily. With the aperture shoe member moved backwardly on right lines into pressure engagement with the film without any tendency for angular movement in any direction, there is no likelihood that the film will be displaced from its normal position or that the film will be subjected to undue stress by pressure thereon. With the parts in their operative position for operation of the projector, the shoe member applies a steady even pressure on the film but is always ready to yield forwardly as may be necessary by reason of any unevenness of any type in the film.

While I prefer to employ the form and arrangement as shown in the drawings and as above described the invention is not to be limited thereto except so far as the claims may be so limited, it being understood that changes might well be made in the form and arrangement of the parts without departing from the spirit of the invention.

I claim:

1. In a mechanism of the type described, the combination of an aperture plate having an opening for the passage of a beam of light therethrough, a supporting member slidably mounted in position so as to be movable toward and from said aperture plate and to be held against angular movement with respect to said aperture plate, an aperture shoe member for applying pressure backwardly on a film interposed between the aperture shoe member and the aperture plate, and means comprising a flat spring carried by said supporting member and provided with notches at its end portions adapted to have latching engagement with said aperture shoe member so as to hold it removably in position with respect to the supporting member and to hold it normally at the limit of its movement backwardly with respect to said supporting member.

2. In a mechanism of the type described, the combination of an aperture plate having an opening for the passage of a beam of light therethrough, a flat plate slidable forwardly and backwardly at right angles to said aperture plate so as to be held against angular movement, a supporting member in the form of a housing rigidly mounted on said plate at its rear end portion so as to extend sidewise and having an opening in its rear face extending into the outer side face of the housing, an aperture shoe member slidable into position in said housing through said opening, and spring means adapted by latching engagement with the aperture shoe member to hold it removably in position in the housing and adapted normally to press said aperture shoe member to the limit of its motion backwardly with respect to said housing.

3. In a mechanism of the type described, the combination of an aperture plate having an opening for the passage of a beam of light therethrough, a supporting member in the form of a housing having an opening in its rear face extending into the outer side face of the housing, an aperture shoe member slidable into position in said housing through said opening, a flat spring carried by said housing having releasable snap engagement with said aperture shoe member for holding said shoe member removably in position in the housing, and means for mounting said supporting member in front of said aperture plate and adapted to hold the supporting member normally against angular movement with respect to said aperture plate but to permit it to move toward and from said aperture plate.

4. In a mechanism of the type described, the combination of an aperture plate having an opening for the passage of a beam of light therethrough, a supporting member in the form of a housing having an opening in its rear face extending into the outer side face of the housing, an aperture shoe member slidable into position in said housing through said opening, a flat spring attached at its intermediate portion to the front face of said housing, blocks carried by the end portions of said spring extending backwardly through openings in the wall of the housing and having notches in their rear faces adapted to have operative engagement with rib portions of said aperture shoe member for holding said shoe member removably in position in the housing, and means for mounting said supporting member in front of said aperture plate and adapted to hold the supporting member normally against angular movement with respect to said aperture plate but to permit it to move toward and from said aperture plate.

THEODORE S. BRISKIN.